United States Patent
Lee et al.

(10) Patent No.: US 7,624,214 B2
(45) Date of Patent: Nov. 24, 2009

(54) RESOURCE ALLOCATION METHOD IN A PCA PERIOD OF MBOA MAC

(75) Inventors: Seong Hee Lee, Seoul (KR); Seong Hee Park, Daejeon (KR); Il Soon Jang, Chungcheongbuk-do (KR); Sang Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 11/861,640

(22) Filed: Sep. 26, 2007

(65) Prior Publication Data
US 2008/0082709 A1 Apr. 3, 2008

(30) Foreign Application Priority Data
Sep. 29, 2006 (KR) ............... 10-2006-0096563

(51) Int. Cl.
*G06F 13/00* (2006.01)
(52) U.S. Cl. ............... 710/240; 710/117
(58) Field of Classification Search ............. 710/36–45, 710/113–119, 240–244
See application file for complete search history.

(56) References Cited

U.S. PATENT DOCUMENTS 6,385,678 B2 * 5/2002 Jacobs et al. ............ 710/113
6,651,125 B2 * 11/2003 Maergner et al. ............ 710/244
6,745,262 B1 * 6/2004 Benhase et al. ............ 710/40
7,016,985 B2 * 3/2006 Johnson ............ 710/6

FOREIGN PATENT DOCUMENTS

KR 1020050040445 5/2005

* cited by examiner

*Primary Examiner*—Raymond N Phan
(74) *Attorney, Agent, or Firm*—Ladas & Parry LLP

(57) ABSTRACT

A resource allocation method for performing resource competition between protocols based on a protocol in a home network environment using multiple protocols is provided. In the resource allocation method, a request of using a resource is received from an external device. An AIFS value is allocated according to a data type of the resource requested from the device. Then, the resource is not provided to the device for an AIFS period. After passing the period of the AIFS value, a back-off timer period is entered. In the back-off timer period, an application protocol of the external device requesting the resource is identified, and an idle time value is allocated according to a type of the identified protocol. Then, a corresponding resource is provided to the first device coming out of the allocated idle time.

8 Claims, 6 Drawing Sheets

$AIFS[AC] = pSIFS + mAIFSN[AO] * pSlotTime$

| PCA PARAMETER | ACCESS CATEGORY | COMPETTITION WINDOW VALUE |
|---|---|---|
| mCWMin[AC_BK] | AC_BK (Background) | 15 |
| mCWMin[AC_BE] | AC_BE (Best Effort) | 15 |
| mCWMin[AC_VI] | AC_VI (Video) | 7 |
| mCWMin[AC_VO] | AC_VO (Voice) | 3 |
| mCWMax[AC_BK] | AC_BK (Background) | 1023 |
| mCWMax[AC_BE] | AC_BE (Best Effort) | 1023 |
| mCWMax[AC_VI] | AC_VI (Video) | 511 |
| mCWMax[AC_VO] | AC_VO (Voice) | 255 |

FIG. 2

| PCA PARAMETER | APPLICATION PROTOCOL | COPETTITION WINDOW VALUE |
|---|---|---|
| mCWMin [UPnP] | UPnP | 8 |
| mCWMin [BT] | Bluetooth | 6 |
| mCWMin [USB] | USB | 4 |
| mCWMin [1394] | IEEE1394 | 2 |
| mCWMax [UPnP] | UPnP | 1023 |
| mCWMax [BT] | Bluetooth | 1023 |
| mCWMax [USB] | USB | 511 |
| mCWMax [1394] | IEEE1394 | 255 |

FIG. 5

RESOURCE ALLOCATION METHOD IN A PCA PERIOD OF MBOA MAC

CLAIM OF PRIORITY

This application claims the benefit of Korean Patent Application No. 2006-0096563 filed on Sep. 29, 2006 in the Korean Intellectual Property Office, the disclosure of which is incorporated herein by reference.

BACKGROUND OF THE INVENTION

1. Field of the Invention

The present invention relates to a resource allocation method, and more particularly, to a resource allocation method in a PCA period according to MBOA MAC for performing resource competition between protocols based on a protocol in a home network environment using multiple protocols.

This work was supported the IT R&D program of MIC/IITA. [2006-S-071-01, "Development of UWB solution for high speed multimedia transmission"]

2. Description of the Related Art

As various protocols are simultaneously supported in a home network environment, a multi-band OFDM alliance MAC (MBOA MAC) receives attention.

In data communication using MOA MAC, a super frame is used as a basic unit. For example, if one super frame is for 65000 micro seconds, a super frame is repeated at every 65000 micro second, and all type of data communication is performed at every each super frame.

FIG. 1 is a diagram illustrating a structure of a super frame.

Referring to FIG. 1, one super frame is configured of two parts. One is a beacon period for transmitting a beacon frame for synchronizing and managing a network formed by MBOA MAC. In the beacon period, normal data is restricted to transmit, and only beacon frames are exchanged. The other is a data period. The data period is divided again into a distributed reservation protocol (DRP) period reserving and using resources without competition, and a prioritized contention access (PCA) period using resources through competition.

In the PCA period, when external devices are request resources, the external devices are classified by priority based on data type of the resources, and the external devices are forcedly given a discriminated idle time according to the priority for resource competition.

FIG. 2 is a diagram for describing a step of using resources through competition in a PCA period according to MBOA MAC.

Referring to FIG. 2, an arbitration inter frame space (AIFS) value is allocated to each of the external devices requesting resources. The AIFS value assigns an idle time to the external devices for letting the external device in an idle state before competing with other devices for resources. Therefore, all devices requesting the resources to use try to use corresponding resources after being idle as long as the AIFS value.

A priority deciding the AIFS value is defined by data type of resources requested by a device. Generally, it is divided into four categories. Such a classification is an access category.

FIG. 3 is a diagram illustrating an AIFS value defined for an access category according to a data type in a conventional MBOA MAC.

As shown in FIG. 4, four categories are AC_VO denoting voice data, AC_VL denoting video data, AC_BE denoting best effort data, and AC_BK denoting background data. In MBOA MAC, a device using an access category having a higher priority has a shorter AIFS time than a device having a lower priority. As shown in FIG. 3, since the video data has a higher priority than the background data, the video data has a shorter idle time than the background data. A device using data having a higher priority has a shorter idle time than a device using a data having a lower priority. Since a device having a shorter idle time tries to acquire resource after short idle time, the device using the data with higher priority has a large probability to win the competition.

It expects to use multiple protocols in a future home network environment instead of using a single protocol. Recently, there are many researches in progress for developing a method of simultaneously using multiple protocols such as IEEE 1394, USB, Bluetooth, and UPnP. A conventional PCA method is ineffective for multiple-protocol environment because it uses a method of competition based on data type which is effective in a single protocol environment. For example, when two protocols IEEE 1394 and USB using same data type are provided simultaneously, it is difficult to guarantee to give a priority to an application using the IEEE 1394 in a competition with an application using the USB protocol if same data type is used although the application using the IEEE 1394 protocol has higher priority than a PC application using USB protocol because the application using IEEE 1394 protocol is generally used in an AV device handling mess capacity multimedia.

SUMMARY OF THE INVENTION

The present invention has been made to solve the foregoing problems of the prior art and therefore an aspect of the present invention is to provide a resource allocation method for performing resource competition based on a protocol instead of data type in a home network environment.

According to an aspect of the invention, the invention provides a resource allocation method in a PCA period of MBOA MAC. In the resource allocation method, a request of using a resource is received from an external device. An AIFS value is allocated according to a data type of the resource requested from the device. Then, the resource is not provided to the device for an AIFS period. After passing the period of the AIFS value, a back-off timer period is entered. In the back-off timer period, an application protocol of the external device requesting the resource is identified, and an idle time value is allocated according to a type of the identified protocol. Then, a corresponding resource is provided to the first device coming out of the allocated idle time.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a diagram for describing a step of using resources through competition in a PCA period according to MBOA MAC;

FIG. 5 is a diagram illustrating competition window value defined according to an access category based on a protocol type using in MBOA MAC according to an embodiment of the present invention.

DETAILED DESCRIPTION OF THE PREFERRED EMBODIMENT

Exemplary embodiments of the present invention will now be described in detail with reference to the accompanying drawings.

Figure 4:
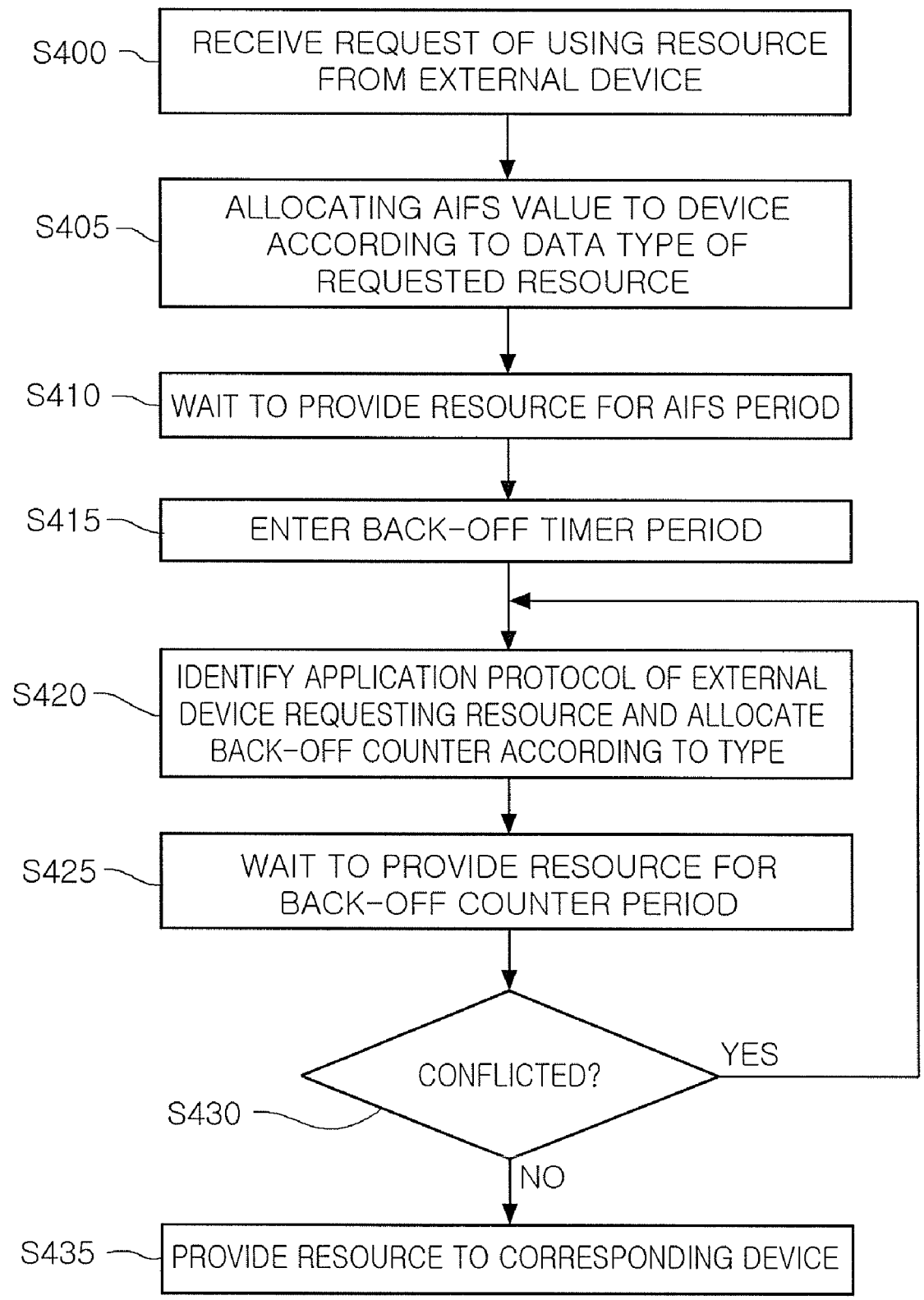
FIG. 4 is a flowchart illustrating a procedure of competing for acquiring resources in a PCA period in MBOA MAC according to an exemplary embodiment of the present invention.

FIG. 4 is a flowchart illustrating a procedure of competing for acquiring resources in a PCA period in MBOA MAC according to an exemplary embodiment of the present invention, and FIG. 5 is a diagram illustrating competition window value defined according to an access category based on a protocol type using in MBOA MAC according to an embodiment of the present invention.

Referring to FIG. 4, requests of using a resource are received from external devices at step S400. A plurality of external devices can request resources not only using a single protocol and but also using multiple protocols. For example, at least one of protocols such as IEEE1394, USB, Bluetooth and UPnP can be used in the present embodiment.

At step S405, an arbitration inter frame space (AIFS) value is allocated to the device according to the data type of a resource requested by the device. The AIFS value is an idle time value assigned to the external devices for letting the external device in an idle state before competing with other devices for resources. The AIFS values are assigned to devices requesting the resources according to priorities. Devices receiving the AIFS values try to use corresponding resources after being idle as long as the assigned AIFS value.

It is preferable that the priority for deciding the AIFS value in the step S405 is previously defined according to data type of a requested resource for a device. Especially, it is preferable to divide the data type in four categories, AC_VO denoting voice data, AC_VL denoting video data, AC_BE denoting best effort data, and AC_BK denoting background data.

In the step S405 for deciding the AIFS value, based on the priority defined according to the data type of the request resource by a device, a competition window value defined with the priority is confirmed. The competition window value requires two values, a minimum value and a maximum value for corresponding data type. Then, a threshold value between the minimum competition window value and the maximum competition window value is selected as an AIFS value. The data type having a higher priority is assigned with a comparative small competition window value. Therefore, the maximum and the minimum thereof become smaller. Since a value is selected among values with a smaller range, there is a large possibility to use a smaller value than a value selected from a comparatively larger range of a maximum value and a minimum value.

As described above, the AIFS value is decided according to the data type in the present embodiment although it is in a multiple-protocol environment. That is, data type used by real application programs cannot be ignored because a service substantially provided to a user is data service. Furthermore, it is better to process isochronous data service with a higher propriety before processing anisochronous data service.

After the AIFS value is allocated through the step S405, the resource is not provided to a corresponding device for a time as long as a value of the AIFS at step S415. That is, devices receiving the AIFS values try to use a resource after being idle as long as a value of each AIFS. Therefore, a device using a data type having a higher priority takes a shorter break than others and enters a next idle time faster, where the next idle time is a back-off timer period. Therefore, devices using data type having higher priority have an advantage over devices using data type having lower priority in resource competition.

At step S415, it enters into the back-off timer period after ending the idle time.

In the back-off time period, the application protocol of the external device requesting the resources is confirmed, and an idle time value is allocated according to the type thereof at step S420. In the step S420, the idle time value is allocated using protocol based competition window values of the devices. That is, the devices in the back-off timer period identify an application protocol of a device using a predetermined data type in the AIFS period. After detecting the target application protocol to use, it selects a competition window value corresponding to the target protocol. Then, an idle time value is allocated by selecting one of values between the minimum value and the maximum value of the competition window value.

FIG. 5 is a diagram illustrating competition window values defined according to access categories of MBOA MAC according to an embodiment of the present invention. In the step S420, for example, if the target protocol is UPnP, 8 is assigned as the minimum competition window value, and 1023 is assigned as the maximum competition window value. Other protocols can have the minimum value and the maximum value of a competition window.

At step S420, a resource is not provided to a corresponding device for the allocated time. For example, in case of UPnP, a value is selected between 8 to 1023. If 100 is selected, a corresponding device will be in an idle state for 100 back-off slots.

At step S420, a protocol having a higher priority has an advantage because it has comparatively smaller competition window value. For example, in case of IEEE 1394 protocol, there is a larger probability to select a value smaller than the value of UPnP selected between 8 to 1023, because a value is selected between 2 and 255 according to FIG. 4. Therefore, a device using the IEEE 1394 protocol has an advantage over a device using the UPnP in resource competition.

After the step S425, if requests of a same resource from a plurality of devices are conflicted at step S430, the step S420 is repeatedly performed at step S435.

Figure 6:
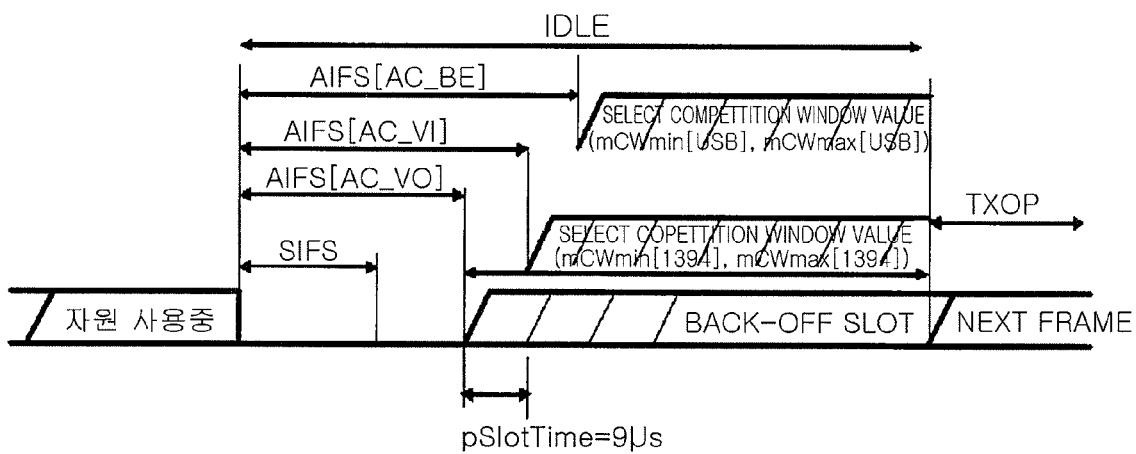
FIG. 6 is a diagram illustrating a procedure for resource competition in a PCA period in MBOA MAC according to an embodiment of the present invention.

FIG. 6 is a diagram illustrating a procedure for resource competition in a PCA period in MBOA MAC according to an embodiment of the present invention.

Referring to FIG. 6, devices have an idle period before trying to use a resource. In the idle period, the devices do not try to use resources for an idle time called as an AIFS. The AIFS period is classified by four access categories divided by a data type. Therefore, devices using a data type having a higher priority have a short break and enter the back-off timer period that is a next idle period. In the present embodiment, the devices entering the back-off timer period calculate an idle time value using a protocol based competition window value proposed according to an embodiment of the present invention. Therefore, the devices entering the back-off timer period identify an application protocol using a predetermined data type in the AIFS period. After detecting the target application protocol to use, the devices select the corresponding competition window value according to protocols defined in FIG. 5. For example, if the target application protocol is UPnP, 8 is selected as the minimum competition window value and 1023 is selected as the maximum competition window value as shown in FIG. 5. The maximum and minimum competition window values are selected for other protocols through the same method.

Figure 1:
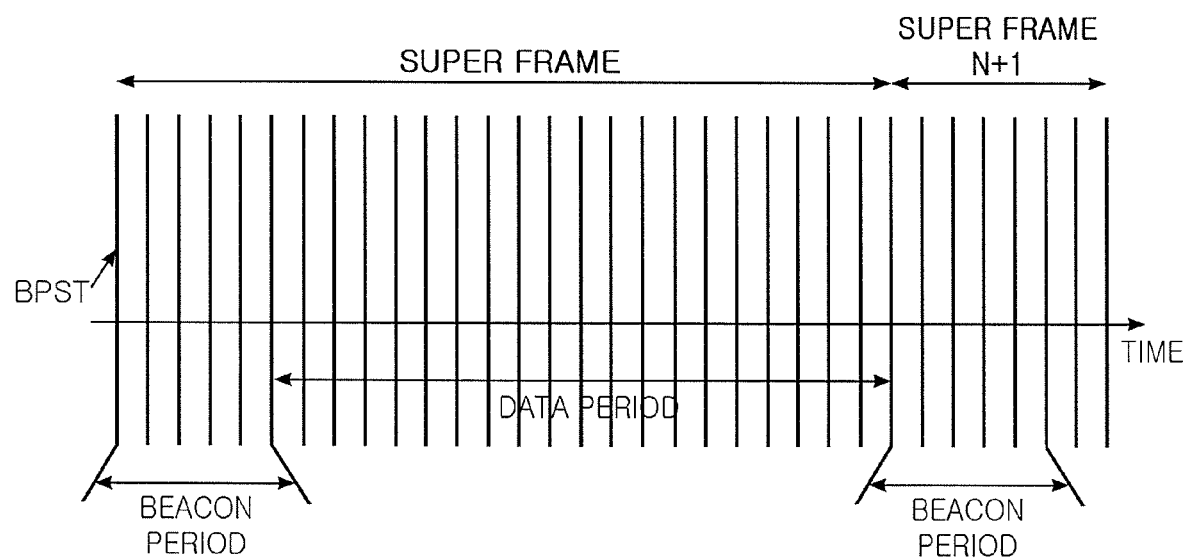
FIG. 1 is a diagram illustrating a structure of a super frame.
Figure 3:
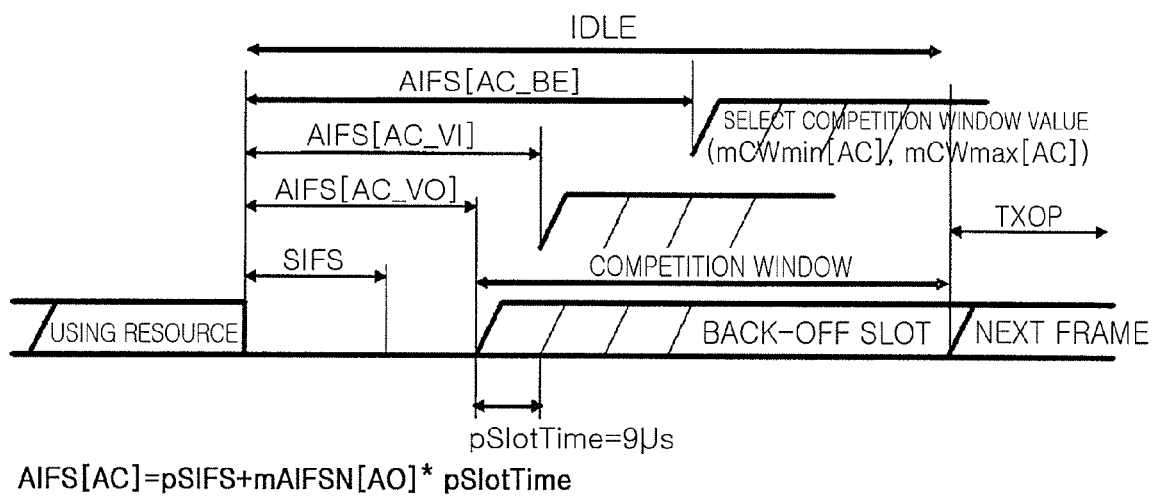
FIG. 3 is a diagram illustrating an AIFS value defined for an access category according to a data type in a conventional MBOA MAC.

After obtaining the minimum and maximum value of the competition window, one value is selected between the maximum value and the minimum value of the competition window. Then, the selected value is used as the idle time value. If 100 is selected, a device is in an idle state for 100 back-off slots. Sine a protocol having a higher priority has a comparatively smaller competition window value, the protocol having the higher priority has an advantage in resource competition. For example, in case of IEEE 1394 protocol, a value is selected between 2 to 255 according to FIG. 3. Therefore, there is a large probability to select a value smaller than the value selected for UPnP, which is selected between 8 to 1023. Therefore, a device using the IEEE 1394 protocol has an advantage over a device using the UPnP in resource competition.

As set forth above, according to exemplary embodiment of the invention, MBOA MAC suitable for multiple-protocol environment is provided by modifying a resource allocation method through competition, used by MBOA MAC, to be suitable to multiple-protocol environment.

While the present invention has been shown and described in connection with the preferred embodiments, it will be apparent to those skilled in the art that modifications and variations can be made without departing from the spirit and scope of the invention as defined by the appended claims.

What is claimed is:

1. A resource allocation method in a PCA period of MBOA MAC, comprising:
   receiving a request of using a resource from an external device;
   allocating an AIFS (arbitration inter frame space) value according to a data type of the resource requested from the device;
   waiting to provide the resource to the device for a period corresponding to the AIFS value;
   entering a back-off timer period after passing the period of the AIFS value;
   identifying an application protocol of the external device requesting the resource in the back-off time period, and allocating an idle time value according to a type of the identified protocol; and
   providing a corresponding resource to the first device coming out of the allocated idle time.

2. The resource allocation method according to claim 1, further comprising defining a competition window value of each protocol in a protocol list used in the device and a data type list of a resource requested by an external device before the step of receiving the request.

3. The resource allocation method according to claim 2, wherein the competition window value has a minimum value and a maximum value for each list.

4. The resource allocation method according to claim 1, wherein if requests for a same resource among a plurality of devices are conflicted after providing the corresponding resource, the identifying the application protocol and the providing the corresponding resource are performed again.

5. The resource allocation method according to anyone of claims 1 to 4, in the receiving the request, a request is received from a device using more than two protocols.

6. The resource allocation method according to claim 5, wherein the protocol is at least one of IEEE 1394, USB, Bluetooth, and UPnP.

7. The resource allocation method according to anyone of claims 1 to 4, wherein the allocating the AIFS includes:
   obtaining a minimum value and a maximum value of a competition window value defined with the priority defined according to a data type of a resource requested by an external device; and
   selecting one value between the maximum competition window value and the minimum competition window value, and deciding the selected value as the AIFS value.

8. The resource allocation method according to anyone of claims 1 to 4, wherein the identifying the application protocol includes:
   identifying an application protocol using a predetermined data type in an AIFS period at devices entering the back-off timer period;
   obtaining a minimum value and a maximum value of a competition window according to corresponding protocols after identifying the target application protocol to use; and
   allocating an idle time value by selecting one value between the maximum value and the minimum value of the competition window value.

* * * * *